United States Patent [19]
Kutay et al.

[11] 3,942,133
[45] Mar. 2, 1976

[54] GAS LASER TUBE WITH STRAY LIGHT RESTRICTION

[75] Inventors: Robert Stephen Kutay, East Petersburg; Kenneth Wentz Laughman, York, both of Pa.

[73] Assignee: RCA Corporation, New York, N.Y.

[22] Filed: Oct. 23, 1974

[21] Appl. No.: 517,241

[52] U.S. Cl. ......... 331/94.5 C; 331/94.5 D; 330/4.3
[51] Int. Cl.² ..................... H01S 3/03; H01S 3/08
[58] Field of Search .................. 331/94.5; 330/4.3

[56] References Cited
UNITED STATES PATENTS

| | | | |
|---|---|---|---|
| 3,428,914 | 2/1969 | Bell | 331/94.5 C |
| 3,477,036 | 11/1969 | Haisma | 331/94.5 D |
| 3,686,584 | 8/1972 | Wahl | 331/94.5 C |

FOREIGN PATENTS OR APPLICATIONS

| | | | |
|---|---|---|---|
| 1,191,483 | 4/1965 | Germany | 331/94.5 C |

OTHER PUBLICATIONS
Ferrario et al., Review of Scientific Instruments, Vol. 43, No. 8, Aug. 1972.

*Primary Examiner*—Robert J. Webster
*Attorney, Agent, or Firm*—Glenn H. Bruestle; George E. Haas

[57] ABSTRACT

Light that is initiated in a laser device includes a diffusion of scattered and reflected light around the laser beam. This diffusion of light occurs because light in the optical cavity of the laser is reflected from the surfaces of the bore and becomes misaligned, so that it leaves the laser along paths which are outside of the cone of light formed by the laser device. This diffusion of part of the laser light reduces the efficiency of the device and is objectionable in many applications. The diffused light is eliminated by providing a restriction in the optical cavity of the laser device which blocks off the stray or misaligned light. This restriction, or beam cleaner, may be positioned at various points along the axis of the optical cavity.

3 Claims, 8 Drawing Figures

GAS LASER TUBE WITH STRAY LIGHT RESTRICTION

This invention is directed to a laser device for generating a beam of coherent light. Such a device normally comprises a hermetically sealed envelope with a gas filling within the envelope. A tube extends within the envelope and has an accurately formed bore. An optical mirror closes each end of the bore to form a resonator cavity within the bore. The tube has an opening extending through into the envelope to form a passageway connecting the bore with the inside of the envelope. A cathode electrode is mounted within the envelope spaced from the tube while an anode electrode is fixed through the tube wall and has a portion which is exposed to the space within the bore. In operation a gaseous discharge is set up between the cathode and anode electrodes, which causes the gaseous filling within the bore to lase providing light within the bore which is reflected back and forth within the resonator cavity. A portion of the light passes through one of the mirrors as a beam of coherent light projected along the axis of the bore.

Lasers of the type described above also provide stray and unwanted light radiation which passes out with the laser beam to form a diffusion of light around the laser beam. This unwanted light is normally that which is reflected from surfaces within the bore and which sets up a lasing action providing deleterious light outside of the directed or focused light within the resonator cavity. This unwanted light passes out of the tube and forms a scattering of light, as a halo-like diffusion about the laser beam. This scattered light is objectionable when the laser beam is being observed by a detecting telescope or when used with a lens system to enlarge the laser beam spot. It is desirable then to reduce or minimize the scattered light and provide a purer laser beam required for certain optical systems.

SUMMARY OF THE INVENTION

In accordance with embodiments of the invention, there is provided in a laser device a tubular structure having a passage therethrough forming a coaxial portion of the tubular bore of the laser. The passage through this tubular structure is smaller than the bore. Various modifications of this tubular structure are possible with the tubular structure being either an integral portion of the laser tube forming the bore, or a separate structure mounted either within the bore of the resonator cavity or fixed to one end of the cavity and coaxially aligned with the bore. The tubular structure may be formed of a block of glass or ceramic or may be a coil spring-pressed within the bore and formed of a low sputtering metal or glass.

DETAILED DESCRIPTION OF THE DRAWING

Figure 1:
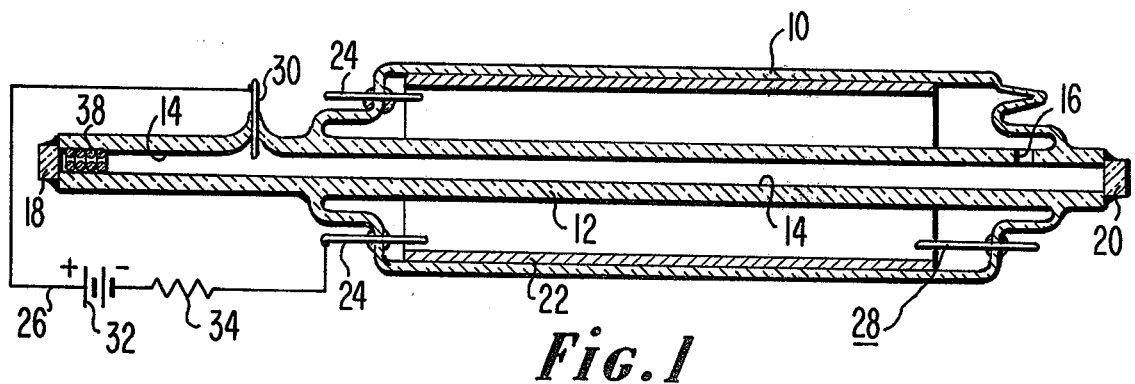
FIG. 1 is a longitudinal, sectional view of a laser tube incorporating an embodiment of the invention.

FIG. 1 discloses a laser device comprising a hermetically sealed glass envelope 10 enclosing, in part, a glass tube 12 which extends through the envelope and to which the envelope is sealed as indicated in the figure. The glass tube 12 has an accurately formed bore 14 extending from one end of the tube to the other. The portion of bore 14 enclosed in the envelope has an opening 16 forming a passageway between the bore 14 and the inside of the glass envelope 10. One end of the bore 14 extends outside of the envelope 10 and is closed by a partially reflecting optical mirror 18, sealed to the end of the bore and hermetically closing the bore. The other end of tube 12 extends outside of the envelope 10 and is also closed by a second optical reflecting mirror 20, sealed to this end of the bore to hermetically close the bore.

The mirrors 18 and 20 are accurately aligned, whereby light formed within the bore is accurately reflected between the mirrors and substantially along the bore axis. A cathode electrode comprises a metal cylinder 22 coaxially mounted within the tubular envelope portion 10 and closely spaced from the inner wall of the envelope 10. The cathode cylinder is supported within the envelope by being rigidly fixed either directly or by support wires to metallic leads 24 sealed through one end of the envelope 10. One or more of the leads 24 may be used as an electrical lead connecting the cathode cylinder 24 to an external circuit 26. The other end of the cathode cylinder 22 may be either supported by metal pin 28 sealed to the inner glass wall of the envelope 10, or may be merely supported from the glass wall of envelope 10 by bulb spacers of a known type.

The envelope 10 is evacuated and filled with a helium-neon mixture of gas of the proper amount and pressure needed to provide the lasing action required to produce the laser beam of the device.

An anode electrode consisting of a metal pin 30 is sealed through the wall of that portion of tube 12 extending outside of the envelope 10. The pin 30 extends into a space communicating with the bore 14. As is well known, lasing action is initiated within the bore 14 by providing a high D.C. potential in the order of 10,000 volts, for example, between the cathode cylinder 22 and the anode pin 30. This potential may be provided by the operating circuit 26, wherein the anode and cathode electrodes are connected in series with a source 32 of D.C. potential and a resistor 34 in the order of 120,000 ohms. The potential differences between electrodes 30 and 22 initiate a gaseous discharge within the bore 14 and in the region from the opening 16 to the anode region 30. The gaseous discharge initiates a lasing action of the helium-neon atoms within the bore, wherein a coherent light is emitted by the excited gas. The light is reflected back and forth between the mirrors 18 and 20 to form a beam extending substantially along the axis of the bore 14 and which will pass out of the bore 14 through the output mirror 20.

The light reflected back and forth through the optical resonator of bore 14 is substantially aligned along paths parallel to each other and to the axis of the bore 14. This parallel light forms a substantially compact beam passing out of the laser device as a parallel light beam having very small beam divergence in the order of one milliradian for example. However, in addition to this parallel beam, an amount of scattered light passes out of the laser device. This scattered light is not confined to the parallel beam of light but rather escapes from the laser bore 14 at a slightly different angle so as to form a halo of diffusion of light around the parallel light beam. For example, FIG. 3A schematically indicates the condition that occurs around a laser beam when detected at a target displaced from the laser device. The scattered and unwanted light is represented by the shaded area 37 around the dark center 36 which represents the concentrated laser beam. The diffused light region 37 is in the form of a halo around the beam and provides light which is deleterious in devices and applications where a pure laser beam is required.

Figure 2:
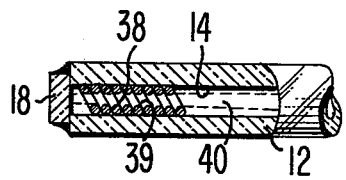
FIG. 2 is an enlarged partial, longitudinal, sectional view of the embodiment of the invention incorporated in the structure of FIG. 1.

FIGS. 1 and 2 disclose an embodiment of the invention wherein at the anode end of the tube 12 and adjacent to the mirror 18 there is positioned a short coil of metal wire 38.

The coil 38 constitutes a tubular structure having a central passage 39 therethrough, which is optically aligned with the axis of the bore 14. The mirror 20 in the laser device of FIG. 1 may be, for example, a spherical mirror wherein the light reflected from mirror 20 is directed toward mirror 18 as a cone of light 40, schematically indicated in FIG. 2. The coil of wire 38 should only be of a size that the passage 39 is slightly larger than the cone of light 40 in the region of the mirror 18. Thus, the reflected cone of light 40 passes through the coil of wire 38 and is not intercepted thereby. As explained above, however, additional light is either generated within the region between cone 40 and the inner wall bore 14, or light is reflected into this region from the cone 40. This constitutes unwanted and scattered light which may strike the wall of bore 14 at a glancing angle and be directed through the output mirror 20. Also, the light may further provide a lasing action in the region of the bore between the light cone 40 and the inner wall of the bore. This constitutes spurious light which is not aligned substantially parallel with the axis of bore 14 and will also pass through the output mirror 20 at a larger angle to the axis. It is this unwanted and unaligned light that provides the halo 37 around the output laser beam 36, schematically illustrated in FIG. 3A.

In a laser device of the type disclosed and described in FIG. 1, the cone of light 40 may, for example, have a diameter of 0.5 mm. in the region of the mirror 18. The passage 39 through the coil or wire 38 is substantially 0.7 mm. in diameter. These values are only one example of the relative size of the passage 39. The coil 38 is operative as long as its passage 39 is 10% to 15% greater in diameter than the cone of light 40 passing through it.

The effect of the wire coil 38 is to block the passage of this spurious light from one mirror to the other so that the reflective light is confined substantially to the inner cone 40 shown in FIG. 2. Thus, the coil 30 forms, in effect, a blocking diaphragm and confines the light striking the mirrors to those substantially parallel coaxial rays of cone 40 extending between the mirrors.

Figure 3:
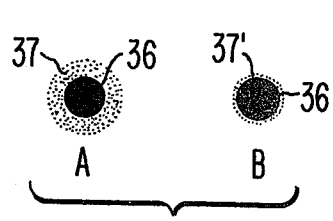
FIG. 3 is a schematic representation of the effect of applicant's invention when incorporated in a laser device.

The visual effect of the invention is disclosed schematically in FIG. 3B, where the laser beam 36 is shown as surrounded only with a much smaller halo 37' than that disclosed in FIG. 3A. The schematic showing of FIG. 3 indicates that the coil 38 provides a much clearer laser beam and one confined substantially to the inner parallel light issuing from the device along the axis of the bore 14. The effect is to radically cut down the spurious light around the laser beam.

The embodiment of the invention disclosed in FIGS. 1 and 2 comprises a coil of metal wire having a low sputtering characteristic under bombardment by charged ions. Such metals are those of tungsten, molybdenum, titanium and zirconium, for example, or alloys of these metals. The advantage of using a coil of wire 38 is that it is easily formed and can be press-fitted into the bore 40 so that it is tightly sprung against the inner wall of the bore and is held in position by this spring action. Thus, no attaching means is required to hold the coil 38 within the bore.

Figure 4:
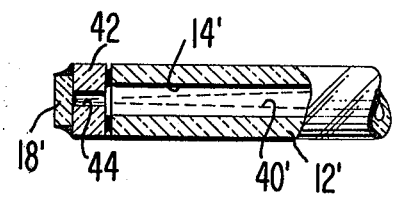
FIGS. 4, 5, 6, 7 and 8 are longitudinal, sectional views of portions respectively of laser devices of the type shown in FIG. 1 and describing other embodiments of the invention.

Other modifications of the invention are disclosed in FIGS. 4 through 8. FIG. 4 shows a tubular structure consisting of a block of glass, or ceramic, 42 sealed directly to the anode end of a bore tube 14'. The block 42 has a passage 44 therethrough which is optically aligned with the axis of the bore 14'. The open end of passage 44 is hermetically closed by sealing an optical reflector 18' to the face of the block 42. The length of passage 44 is not critical but its diameter should be slightly larger than the diameter of the cone of light 40' directed at the mirror 18'.

Figure 5:
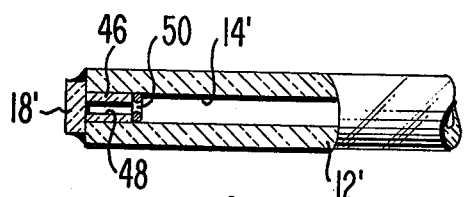

FIG. 5 discloses a tubular structure consisting of a short ceramic or glass tube 46 positioned in the anode end of the bore tube 12'. The tube 46 also has a central passage 48 therethrough, optically aligned with the axis of the bore 14'. The tube 46 may be sealed by an epoxy material within the end of the tube 12' or may be held in position by a split spring washer 50. Again, the end of the bore 14' and the passage 48 aligned therewith is closed by the optical reflector 18' sealed to the end of the tube 14.

Figure 6:
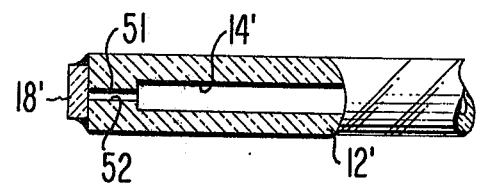

FIG. 6 discloses a tubular structure which is formed integral with the glass tube 12' and the laser device. For example, the bore 14' of FIG. 6 is described as having a restriction 51, which is optically aligned with the axis of bore 14. The restriction 51 is provided by an inwardly extending portion of tube 12' and the passage 52 therethrough is again closed by an optical reflector mirror 18' hermetically sealed to the end of the tube 12'.

Figure 7:
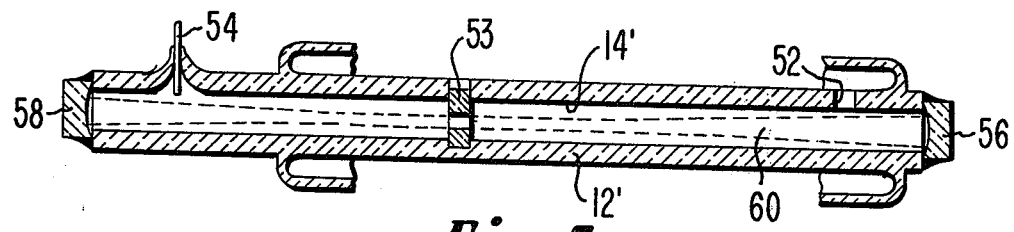
Figure 8:
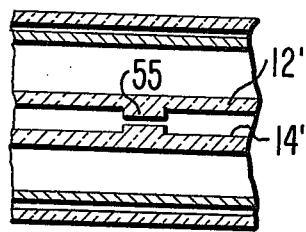

FIGS. 7 and 8 describe embodiments of the invention wherein the restrictions 53 and 55, respectively of the bore 14 of the laser device are provided within a central portion of the bore 14' and within the active plasma region extending between the opening 52 between bore 14 and the anode 54 of the device. It is possible to provide this restriction within the central region of bore 14 when spherical or concave optical reflectors 56 and 58 are used at the ends respectively of the laser bore. Such reflectors provide a cone of light 60 having a minimum cross-sectional area within the central region of the bore between and thus positioning the bore restriction at this point in no way blocks the central core of the light cone passing through the optical cavity of the laser device. The restriction may be formed as shown in FIG. 7 as a glass or ceramic tube 53 coaxially fitted into the tube 12' or an integral portion 55 of the tube 12, as shown in FIG. 8. A metal restrictive tubular structure in the device of FIG. 7 would not be feasible, since the metal within this plasma region of the tube would tend to be evaporated or sputtered away by the gaseous discharge within the bore.

The invention described above has been related to a helium-neon gas laser. However, beam restriction structures, of the type described, are also of use in any fundamental mode laser. The length of the passage through the restriction formed by the several modifications described is not critical and may be a mm. or less in length, as provided by a metal plate or washer. For example, such a thin metal plate may be substituted for the glass or ceramic block 42 in the modification of FIG. 4. The aperture through the metal plate forming the passageway is one which should be accurately formed and aligned coaxially with the axis of the bore 14'. The size of the passageway through such a metal plate may be of 0.25 mm. in length. However, the passageway through a restrictive structure may be as long 25 mm. or more. Long passageways through the restrictive structures are more critical to align with the axis of the bore. The restrictive tubular members formed by the glass or ceramic block, as shown in FIGS. 4, 5 and 8, may also be formed of epoxy or plastic materials which have very low vapor pressure and which in no way will be distorted or destroyed by the low temperature bake-out of the laser device during fabrication.

The several embodiments of the invention are disclosed as providing the restrictive structure within the bore of the resonant optical cavity formed by the tubular bore member 12 or 12'. However, if the mirrors are not used to close the ends of the bore members, the restrictive structure need not be within the bore member but instead mounted closely adjacent to the reflecting mirror and accurately aligned, coaxially with the bore of the laser.

We claim:

1. A laser device for generating a beam of coherent light, said device comprising a hermetically sealed envelope, a gas filling within said envelope, a tube extending within said envelope and having a bore, a different optical mirror adjacent to each end of said bore and aligned with the axis of said bore to form an optical resonator cavity within the bore, one of said mirrors being spherical for directing a cone of light along the axis of said bore toward the other one of said mirrors, an anode electrode fixed within the envelope and having a portion exposed to the space within said bore, a cathode electrode mounted within said envelope and spaced from said anode, and a coil spring pressed within said bore and having a passage therethrough positioned coaxially with said bore between said optical mirrors, said passage being smaller than said bore and larger than the cone of light directed from said spherical mirror.

2. A laser device in accordance with claim 1, wherein said coil is formed of a metal having a low sputtering characteristic under ion bombardment.

3. A laser device in accordance with claim 1, wherein said coil is formed of one or more of the metals tungsten, molybdenum, titanium and zirconium.

* * * * *